May 29, 1928.  1,671,625

H. W. BROWN ET AL

UNIVERSAL INDUCTANCE DEVICE FOR RADIO RECEIVING APPARATUS

Filed Oct. 7, 1925   2 Sheets-Sheet 1

INVENTORS.
Harry Wilbur Brown
Gordon O. Wilkinson
By Cyrus N. Anderson
ATTORNEY.

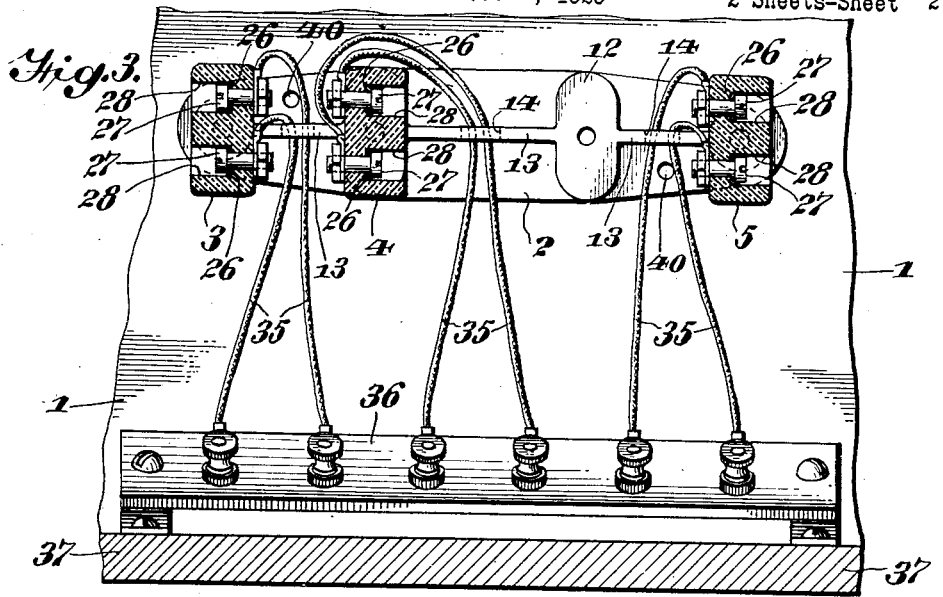
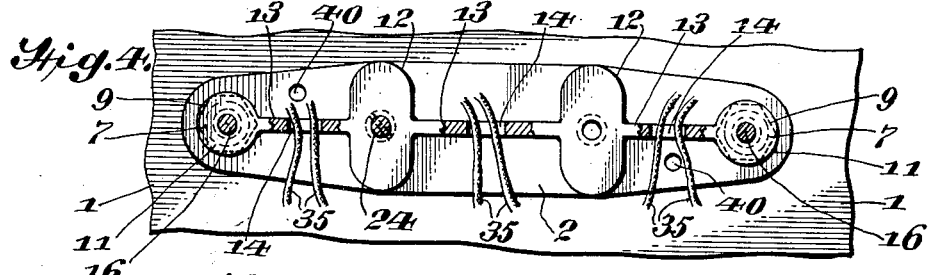
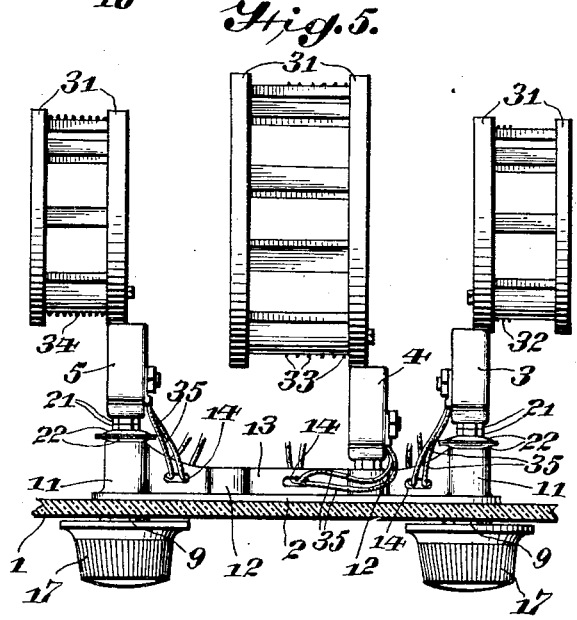
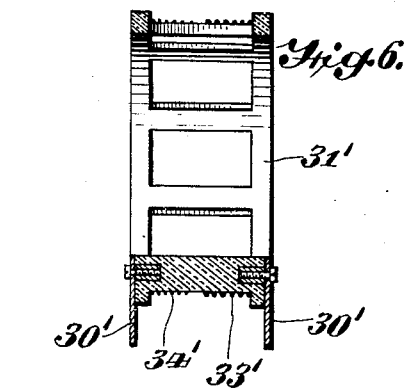

Patented May 29, 1928.

1,671,625

UNITED STATES PATENT OFFICE.

HARRY WILBUR BROWN, OF PHILADELPHIA, AND GORDON O. WILKINSON, OF ARDMORE, PENNSYLVANIA.

UNIVERSAL INDUCTANCE DEVICE FOR RADIO RECEIVING APPARATUS.

Application filed October 7, 1925. Serial No. 60,945.

Our invention relates to devices in which means are provided whereby a maximum and what may be described properly as a universal adjustment of the inductance coils of a radio receiving set may be effected.

In view of the variation of the wave lengths employed at the present time by different radio transmitting stations or at the same station it is highly desirable that receiving apparatus be employed which has means by which such apparatus may be readily adapted to the reception of waves of different lengths. The waves employed in radio transmission may vary from a few meters to hundreds of meters in length. It is a fact well known to those familar with the art that a radio receiving set or apparatus which may be adapted for the perfect reception of waves say of a length of fifty meters would not intercept and receive waves of a length say of two hundred meters, much less waves of several hundred meters in length.

The general object of our invention, therefore, is to provide means whereby coils adapted for the reception of waves falling within one band of frequencies may be substituted for coils adapted for the reception of waves falling within another band of frequencies.

It is also an object of the invention to provide a device having means whereby a wider range of adjustment between the same coils may be effected than heretofore has been practically possible, as far as we are aware.

A further object of the invention is to provide means for supporting the inductances of a radio receiving set or apparatus in which the said inductances may be adjusted with respect to each other by rotating either one or both of two adjacent cooperating inductances or in which either one or both of said inductances may be removed from its or their support and replaced thereon in an entirely different position and relation to each other.

The many objects to be accomplished by our invention not hereinbefore mentioned either will be referred to in the detailed description thereof which follows or will become apparent from such description.

In order that the invention may be readily understood and its practical advantages fully appreciated reference may be had to the accompanying drawings in which we have illustrated one form of a convenient mechanical embodiment thereof. However, it will be understood that our invention is susceptible of embodiment in other forms of construction than that shown and that changes in the details of construction may be made within the scope of the claims without departing from the said invention.

In the drawings:

Fig. 3 is a vertical sectional view taken on the line 3—3 of Fig. 1;

Fig. 4 is a view partly in rear elevation and partly in vertical section of a supporting means for the inductances;

Fig. 5 is a plan view showing certain of the inductances in different positions from those shown in Fig. 1; and Fig. 6 is a sectional view of a structure comprising primary and secondary coils mounted upon a single support.

Figure 1:
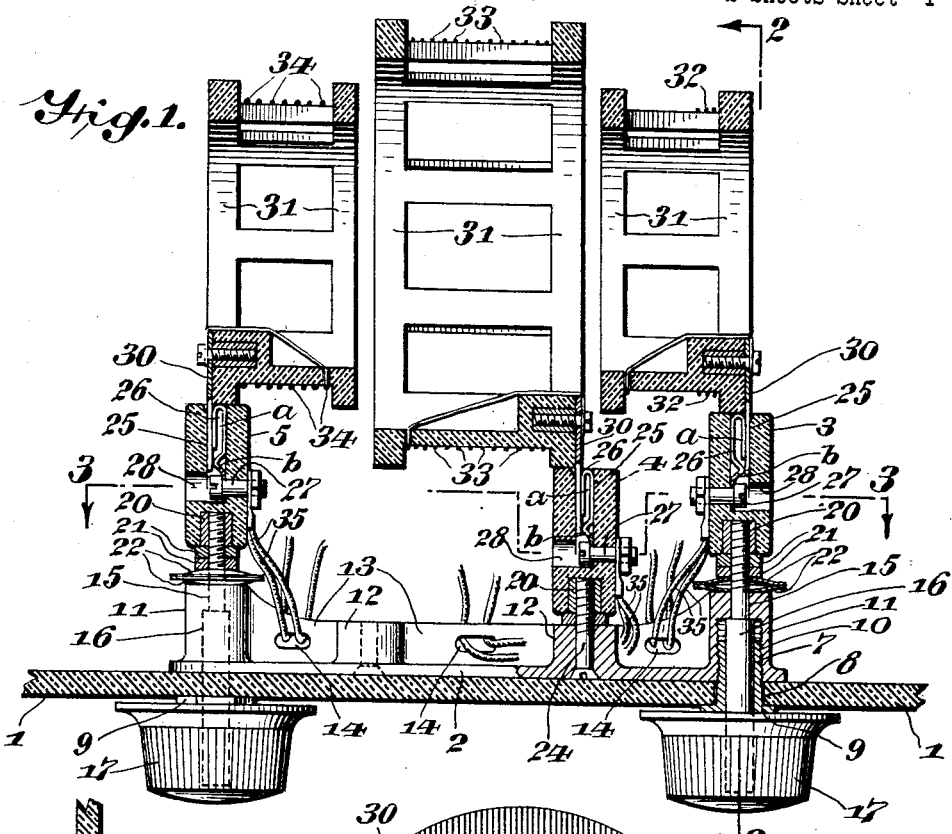
Fig. 1 is a view in horizontal section of a device embodying our invention.

Referring to the drawings:

1 designates the front panel of a radio receiving set or apparatus which consists usually of insulating material. Mounted upon the inner side of the panel 1 is a supporting member 2 upon which socket members 3, 4 and 5 are adapted to be supported, which members are adapted to receive and support the inductances, as will be hereinafter pointed out more fully.

The member 2 is connected to the panel 1 and supported thereon by means of bushings 7 which extend through openings 8 in the panel 1. These bushings are provided with flanges 9 constituting heads which contact with the outer side of the panel 1. The inner screw-threaded portions thereof have screw-threaded engagement with openings 10 in the supporting member 2. These openings are formed in post-like portions or projections 11 upon the inner side of the member 2. This member is also provided with additional projections or post-like portions 12. Interposed between the several projections or posts are webs 13, each of which webs is provided with an opening 14 for a purpose which will be hereinafter explained. A hole 15 extends from the bottom of each of the relatively large openings 10, previously referred to, through the inner end portions of the projections or posts 11. Mounted within the tubular bushings 7 and extending through the holes 15 are shafts 16 upon the outer ends of which dials or knobs 17 are mounted by means of which the said shafts may be rotated. Mounted upon the inner ends of the shafts 16 are the socket members 3 and 5, previously referred to. Each of these socket members consists of insulating material and is provided with an opening in it front end within which opening is mounted an internally screw-threaded bushing 20. The inner ends of the shafts 16 are in engagement with the bushings 20. Mounted upon the said shafts in rear of the adjacent ends of the sockets 3 and 5 are nuts 21 between which and the adjacent inner ends of the posts 11 are spring friction disks 22 which operate to frictionally hold the shafts 16 in any position to which they may be adjusted.

The socket member 4 previously referred to is likewise provided upon its front end with an opening within which is mounted an internally screw-threaded bushing 20 with which the screw threaded inner end of a screw bolt 24 is in engagement. The socket members preferably are constructed of moldable material, such as rubber, or a phenolic condensation product by molding, and they are respectively provided with socket openings 25 within which spring contact members 26 are mounted. These springs are of the construction shown in Figs. 1 and 2 of the drawings and comprise a base portion, the inner end of which is provided with an opening through which the retaining bolts 27 constituting binding posts may be passed. The said posts extend through openings through one side of the sockets, as indicated. For the purpose of facilitating the insertion of the binding posts into the positions shown in Figs. 1 and 2 of the drawings the sockets are provided with openings 28 through which the said posts are adapted to be inserted through the openings through the base portions of the contacts and the openings through the opposite sides of the sockets and by means of which also access may be had to the head portions of the said binding posts. The opposite or rear end portions of the spring contacts comprises U-shaped portions, as indicated at $a$, while an intermediate portion of the base of each contact member comprises an angular upset portion $b$. The contact bars or strips 30 which are mounted upon and project from the supports 31 of insulating material for the various inductance coils 32, 33 and 34 not only contact with one side of the U-shaped portion $a$ of each of the contacts, but also with the apex of the upset portion $b$, previously referred to. By causing the contact bars 30 to make double contact in this manner a better contact is effected than otherwise would be the case. Of the inductances referred to 32 is a "tickler" coil, while 33 and 34 are the secondary and primary coils of a transformer. The leads to the respective inductances through the contacts mounted within the sockets 3, 4 and 5 are indicated at 35. These leads have connection with binding posts upon a strip of insulating material 36, preferably mounted upon the base portion 37 of the container or frame portion of the apparatus. The said strip may, however, be mounted in any suitable manner upon any suitable part of the structure.

Figure 2:
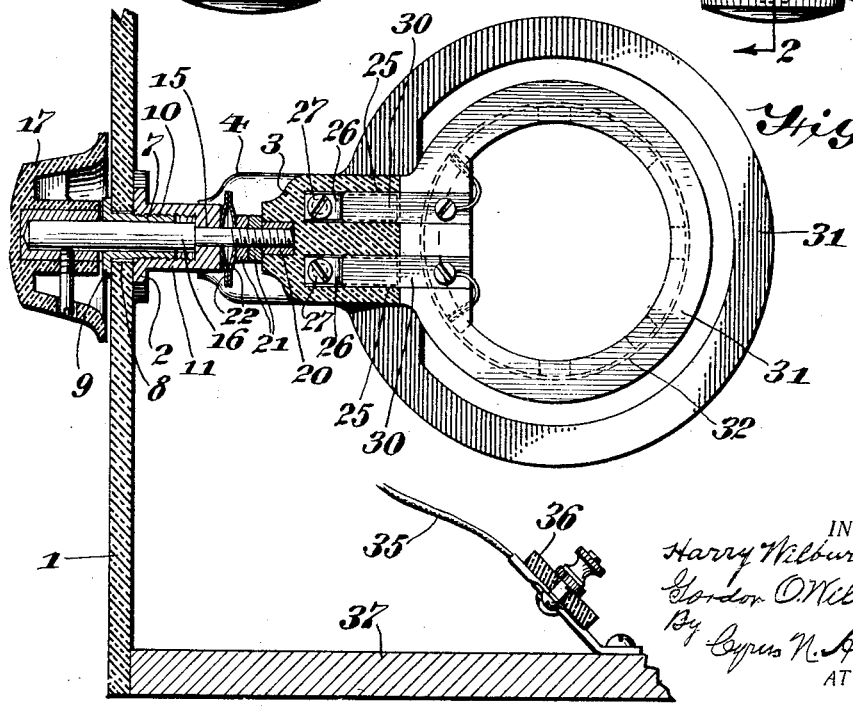
Fig. 2 is a view in vertical section taken on the line 2—2 of Fig. 1.

The lead wires which have connection with the binding posts of the sockets 3, 4 and 5 extend through openings 14, as shown in Fig. 1 of the drawings.

It will be noted that the supporting contact bars 30 are connected with one side of the supports 31 for the inductance coils 32, 33 and 34 and also that the coils 32 and 34 are shown in Fig. 1 as being located inwardly of the contact bars 30 for supporting said "tickler" and primary coils. The coils 32 and 34 are adapted to be rotated, such rotation being effected by means of the dials or knobs 17 mounted upon the shafts 16. The rotation of the coils 32 and 34 varies the coupling between the said coils and the secondary coil 33. The function of such rotation in the present construction is the same as that in constructions now in use and need not be further explained.

Upon rotation of the shafts 16 together with the sockets mounted thereon the leads 35 connected therewith if not held might be varied in position to change their relation to each other and thereby cause unwanted and uncontrollable effects on the other coils. In order to prevent as far as possible a variation in the position of the leads 35 which are adapted to have connection with the coils 32 and 34, the said leads are passed through the openings 14 adjacent the projections or posts 11, previously referred to.

In addition to effecting a variation of the coupling between the coil 32 and secondary 33 and the primary coil 34 and the secondary 33 by rotation of the said coils 32 and 34 with the shafts 16 variation may also be effected by removing the contact bars 30 from the socket openings in the socket members 3 and 5 and reversing the positions of the said coils and re-inserting the said contact bars 30 into the said socket openings. Such change in position locates the coils 32 and 34 outside of the contact bars 30, regarding the coil 33 as occupying an inside position. Such change in position merely weakens the coupling; that is, alters the strength of the field between the coil 33 and the coils 32 and 34 without, however, changing the character of the field. In other words, the direction of flow of current through the coils 32 and 34 with relation to the coil 33 is not changed by such reversal. The coils 32 and 34 are shown in such reversed position in Fig. 5 of the drawings. The construction shown in said figure otherwise is identical with the construction shown in the preceding figures of the drawings.

In Fig. 6 of the drawings we have shown a construction in which both the primary and secondary coils 33' and 34' are wound upon a single support 31' of insulating material. In the said construction contact bars or strips 30' are mounted upon the opposite sides of the support 31' and are adapted to be inserted in socket members such as those shown at 3, 4 and 5, which socket members will be mounted upon the projections 12.

The leads 35 which are connected with the secondary coil 33 are also passed through the opening 14 which is located in the web 13 between the posts or projections 12, previously referred to.

Instead of mounting the member 2 upon the side of a vertical support, such as the panel 1, it may be supported in a horizontal position upon the top of a support, in which position the posts or projections 11 and 12 would extend upwardly. For the purpose of mounting the said device 2 in horizontal position upon a support we have provided openings 40 therethrough, as indicated in Fig. 4, for the reception of fastening screws or bolts. If the said member 2 should be supported in horizontal position upon a support any suitable means may be provided for effecting rotatable adjusment of the socket members 3 and 5.

It will be seen that by our invention we are enabled to adjust the primary and "tickler" coils practically universally with respect to the secondary coil; that is to say, the primary and "tickler" coils may not only be rotated with respect to the secondary coil of the transformer without removal from their sockets, but may be removed therefrom and reversed, as described, and also any one of the coils including the primary, secondary and "tickler" coils, or all of them, may be removed and a coil or coils of different value or values and characteristics substituted therefor.

Hence, it is apparent that a device embodying our invention may be adjusted and employed for the reception of electromagnetic waves having a wide range of variation as to length. We have by our invention provided means by which the adjustment of the inductances of a radio set or apparatus may be effected to such an extent as to render the said set or apparatus adaptable for use in the reception of waves of substantially any character as to length which may be employed in radio transmission.

Having thus described our invention, what we claim and desire to secure by Letters Patent is:

1. In a device of the character described, the combination of a supporting member, socket members mounted upon said supporting member, means for effecting rotation of one or more of said socket members, inductances, and means for detachably mounting the said inductances upon said socket members in either of two positions in parallel relation to each other, the changing of the said inductances from one position to the other operating to vary the distance between the same whereby the strength of the coupling between the said inductances is varied.

2. In a device of the character described, the combination of a supporting member, socket members mounted upon said supporting member, said socket members being relatively adjustable with respect to each other, means for effecting such relative adjustment, inductances, and means for detachably connecting said inductances with the said socket members, said means being located in planes parallel with and laterally of the transverse axis of the inductances with which they are respectively associated.

3. In a device of the character described, the combination of a supporting member, inductances, and means whereby the said inductances may be mounted upon the said supporting member, the said means including means whereby inductances of one value may be exchanged with inductances of different values, the last-mentioned means being located in planes parallel with and laterally of the transverse axis of the inductances with which they are respectively associated.

4. In a device of the character described, the combination of a supporting member having projections at intervals thereon, webs connecting said projections, said webs having openings extending therethrough, socket members mounted upon said projections, binding posts mounted upon said socket members, conductor leads extending through the said openings and having connection with said binding posts, inductances having detachable connection with the said socket members, and means whereby relative adjustment between the said inductances may be effected.

5. In a device of the character described, the combination of a supporting means, socket members mounted on said supporting means, which socket members comprise body portions having openings extending thereinto within which are mounted spring contacts, and the said body portions having openings in the opposite sides thereof leading from the bottom portions of the openings within which the said spring contacts are located, said openings being in alinement, and one of them being of a size to permit the insertion of the head of a binding post, binding posts for securing the said spring contacts in position, inductances, supports of insulating material for said inductances, and a contact bar secured to one side of each of the said insulating supports in a plane laterally of and parallel to the transverse axis of the inductances thereon, which contact bars are adapted to be inserted into the first-named openings in the said socket members into engagement with the said spring contacts.

6. In a device of the character described for use in radio receiving apparatus, the combination of a socket supporting bar, means for supporting said bar, an adjusted stationary socket mounted on said bar, socket members rotatably mounted on said bar, inductances, insulating means upon which said inductances are wound, and means carried by said insulating means, whereby said inductances may be mounted upon said socket members in either of two positions relatively to said socket members, the said last-mentioned means being located in planes parallel with and laterally of the transverse axis of the inductances with which they are respectively associated.

7. In a device of the character described, the combination of a bar for supporting socket members, means for supporting said bar, a socket member stationarily mounted of said bar, rotatable shafts mounted on said bar, socket members mounted upon the inner ends of said shafts, spring contacts carried by all of said socket members, inductances, insulating supports for said inductances, and means whereby said insulating supports may be connected to the said socket members in either of two position, the said means being located in planes parallel with and laterally of the transverse axis of the inductances with which they are respectively associated.

In testimony that we claim the foregoing as our invention, we have hereunto signed our names this 6th day of October, A. D., 1925.

HARRY WILBUR BROWN.
GORDON O. WILKINSON.